Sept. 23, 1924.

T. F. HOLDEN

APPARATUS FOR THE MANUFACTURE OF WATER GAS

Original Filed Oct. 17, 1922   2 Sheets-Sheet 1

1,509,554

Thomas F. Holden
By Jas. L. Skidmore
His Attorney.

Sept. 23, 1924.                                                                 1,509,554
                                    T. F. HOLDEN
                     APPARATUS FOR THE MANUFACTURE OF WATER GAS
                        Original Filed Oct. 17, 1922    2 Sheets-Sheet 2
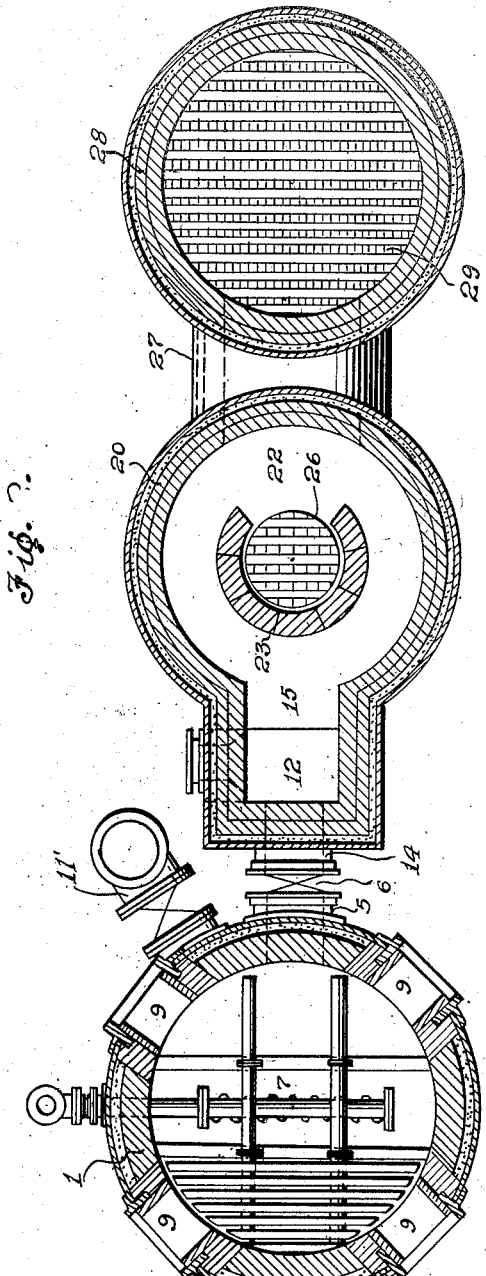
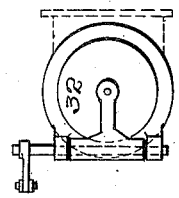
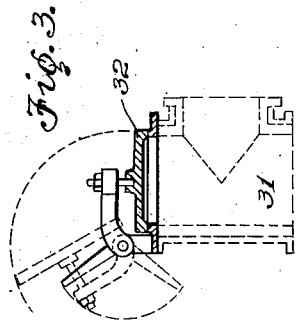
Inventor,
Thomas F. Holden
By Jas. L. Skidmore
    his Attorney.

Patented Sept. 23, 1924.

1,509,554

UNITED STATES PATENT OFFICE.

THOMAS F. HOLDEN, OF WASHINGTON, DISTRICT OF COLUMBIA, ASSIGNOR OF ONE-THIRD TO ROBERT D. WEAVER, OF WASHINGTON, DISTRICT OF COLUMBIA, AND ONE-THIRD TO CALVIN VOS, OF NEW YORK, N. Y.

APPARATUS FOR THE MANUFACTURE OF WATER GAS.

Original application filed October 17, 1922, Serial No. 595,112. Divided and this application filed April 3, 1923., Serial No. 629,619.

*To all whom it may concern:*

Be it known that I, THOMAS F. HOLDEN, a citizen of the United States, residing at Washington, District of Columbia, have invented certain new and useful Improvements in Apparatus for the Manufacture of Water Gas, of which the following is a specification, this application being a division of my application for patent for process of manufacturing water gas, Serial No. 595,112, filed October 17, 1922.

My invention relates to certain new, novel and useful improvements in apparatus for the manufacture of water gas, and consists in making such gas from ignited fuel by a succession of alternate air and steam treatments, the air treatment being so conducted as to accumulate a maximum of sensible heat to the fire bed, and the steam treatment prolonged for a greater period than is customary; of using the sensible heat of the products escaping from the particular air treatment to heat the fire clay refractory region; of means for injecting straight coal gas, either rich or lean in B. t. u. quality as conditions may allow and providing a thorough commingling and mixture between said rich or lean coal gas and the resulting water gas that is made in the generator, and of enriching the said gas produced in the steam treatment in such refractory region by sprayed or vaporized oil, as more fully hereinafter described.

The prime object of this invention is to provide a simple, durable, economical and thoroughly efficient apparatus for the manufacture of water gas, whereby a superior grade and greater volume of gas can be made than from any apparatus of equal proportions that is now employed in the manufacture of such gas.

Another object of the invention is to so construct my improved apparatus as to eliminate the possibility of any excess in the capacity of water gas over the blending, mixing, and fixing capacities of the water gas and enriching oil into a good standard commercial carbureted water gas, as is now experienced in other types of similar apparatus where the generator is far above the mixing and fixing capacities of the carbureter and superheater, that cause an unfixed or streaky quality of carbureted water gas to leave the said apparatus.

Another object of this invention is to provide what may be properly termed an economizing chamber at one side of and forming a portion of the carbureter, adapted to more thoroughly heat the water gas as it is passed upward therethrough, thus delivering said gas into the primary mixing chamber formed at the top portion of the carbureter at a much higher temperature, and producing a drier water gas, before it meets the enriching oil being sprayed into said mixing chamber, since the hot water gas entering into the economizing chamber is protected from the existing chilling during its passage owing to the thicker and better lined refractory tile walls of the economizing chamber.

Another object of the invention is to so construct my improved carbureter with a primary mixing chamber so formed in its top portion, that the water gas is separated into two streams, and said gas is not allowed to meet the oil enricher which is being sprayed into the top of said chamber until the oil has had sufficient time to become thoroughly vaporized and gasified, when they are thoroughly commingled and mixed together and caused to pass down through the checker-work installed in the secondary mixing chamber and become more generally and thoroughly blended together, from whence they pass out, into and up through the superheater where they are more readily fixed into a commercial gas, thus resulting in what is known as carbureted water gas of any desired B. t. u. standard.

Further objects of the invention are to provide more efficient and improved refractory surfaces than are now provided in the standard type of water gas apparatus to insure improved oil results and a corresponding superior fixed carbureted water gas, with less loss of fuel efficiency; to so construct the apparatus as to permit the use of any grade of generator fuel of reasonable standard, such as anthracite coal, oven, chamber or retort coke, and bituminous coal of low sulphur content; to materially increase the capacity above that obtained by any existing water gas apparatus; to eliminate the excessive accumulation of tarry waste and reduce the formation of lamp black to the lowest possible minimum; to inject a certain volume of coal gas low in B. t. u. standard and mix it with carbureted water gas under high temperature regulation and control so that it will be blended into a uniform commercial gas of the desired or required standard; to inject natural gas which is high in B. t. u. quality by mixing it with uncarbureted water gas under high temperature control to reduce said quality so that it will become thoroughly blended into a uniform commercial gas of the desired standard; to reduce and prevent clinker formation when the apparatus is properly operated, hence furnishing a freer and improved circulation of the air and steam blast through the fuel bed, and to change any existing water gas apparatus to my construction at comparatively slight expense to the operating company.

The foregoing and such other objects as may appear from the ensuing description are accomplished by the construction, arrangement, combination and location of the parts hereinafter more fully described, illustrated by the accompanying drawings, and particularly pointed out in the claims appended hereto, it being understood that slight changes in the precise form, proportions and minor details of the construction may be resorted to without departing from the spirit or sacrificing any of the advantages of the invention.

In the accompanying drawings forming a part of this specification it will be seen that:

Figure 2 is a cross section taken on the plane of the dotted lines 2—2, Fig. 1.

Figure 3 is a detail partly in vertical section showing the usual valve seated on the top outlet of the superheater, and Figure 4 is a plan of the detail shown in Fig. 3.

Figure 1:
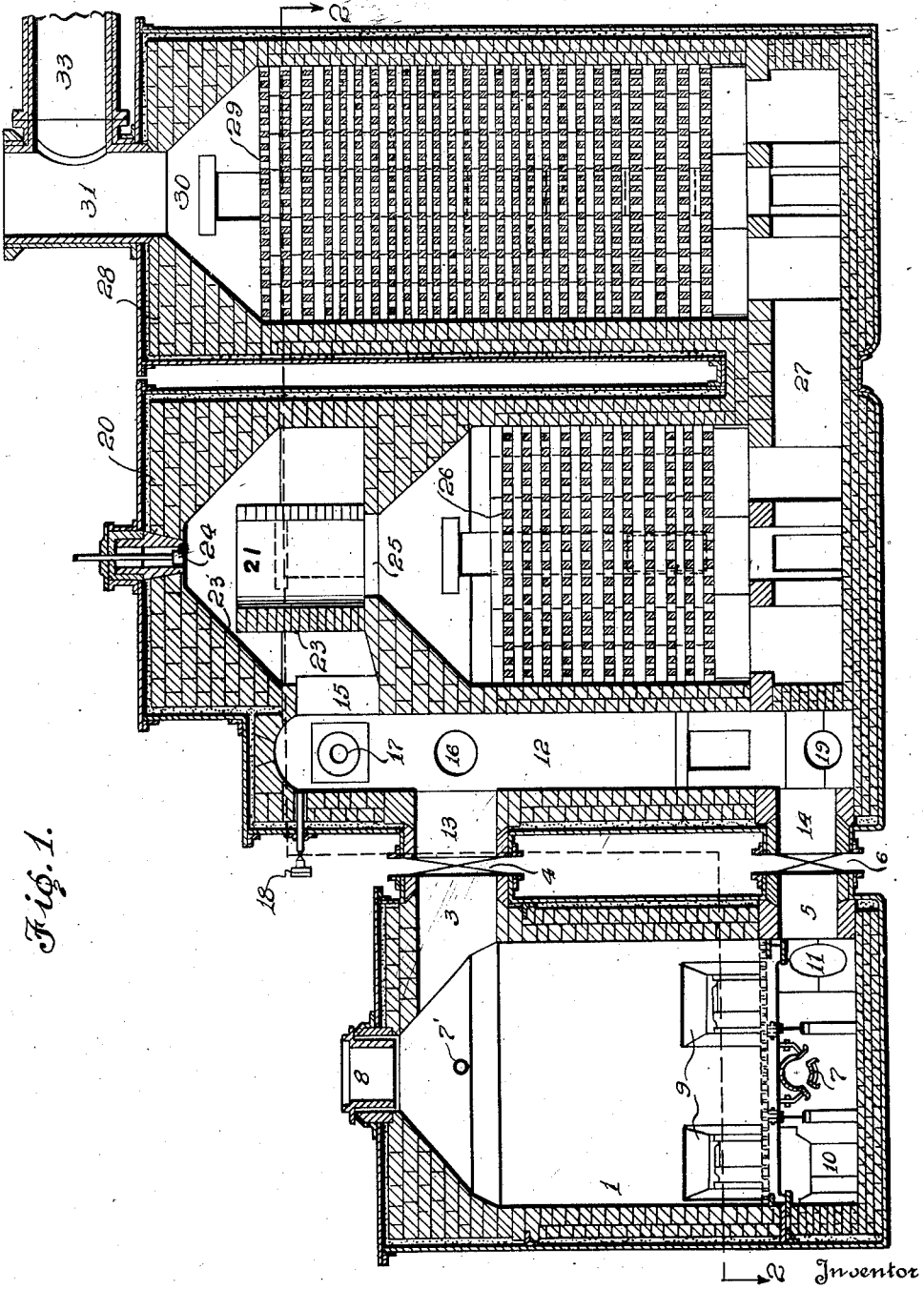
Figure 1 is a vertical section of the improved apparatus embodying my invention.

In the embodiment of my invention as illustrated, the numeral 1 designates the generator provided with an upper up-run wa gas outlet 3, and an upper hot gas outlet gas valve 4, while 5 indicates the lower or down run water gas outlet and 6 the lower gas outlet gate valve. 7 is the lower steam manifold or steam distributor for an up-run of water gas, 7' is the upper steam supply for a down run of water gas, 8 is the top cooling hole or opening, 9 is the cleaning or stoker doors, 10 is the ash cleaning doors, 11 is the primary air blast inlet, 11' is the elbow connected with said inlet, 12 is the economizer chamber between the generator and carbureter and forming a part of said carbureter at one side theerof; 13 is the upper gas inlet to said chamber, 14 is the lower gas inlet to the chamber 12, 15 is the gas outlet from the upper portion of the chamber, 16 is the secondary air blast inlet connected with said chamber 12, 17 is the inlet for the coal gas and natural gas leading to the chamber 12, 18 is the sight cock, and 19 is the ash or residue opening formed in the lower or bottom portion of the economizing chamber.

The carbureter 20 is provided at its upper end portion with a primary mixing chamber 21 having a hot gas inlet 22 to the chamber, said chamber being formed by a horseshoe or U-shaped refractory deflecting wall 23, said wall being adapted to be sealed by expansion when in active operation into contact with the inner upper surface 23' of the carbureter, 24 is the oil spray nozzle suitably fitted in the upper end of the carbureter in communication with the chamber, and 25 is the opening leading from chamber 21 for the passage of the mixed water gas and oil gas from said primary mixing chamber into the secondary mixing chamber forming the body and lower portion of the carbureter, said latter chamber being substantially filled with refractory checker-work, 26, through said checker-work and into the connecting passage 27 between the carbureter and superheater 28, thence into and through the refractory checker-work 29 and through the outlet or gas take-off opening 30 into the stack or gas T 31, provided with the usual valve 32, and thence through the gas take-off connections 33 to the washer box (not shown).

The air, steam, coal gas, natural gas and oil utilized in connection with this apparatus may be supplied from any suitable or desirable source, and either live steam or exhaust steam or both may be employed.

It will be presumed that my improved water gas apparatus is especially designed for use in connection with what is known as the up and down run, and is so constructed that the hot water gas entering the economizing chamber 12 from the generator is protected from the usual chilling effect during its passage due to the thicker and improved refractory tile walls formed in said chamber and as the said water gas enters from the top of said chamber into the carbureter it impinges upon and contacts with the highly heated refractory deflecting wall 23 which causes the gas to be separated into two streams and directs said streams around the wall, thus preventing the said water gas to meet the enriching oil which is being sprayed into the primary mixing chamber 21, until the said enriching oil has had sufficient time to be thoroughly vaporized and gasified in the highly heated mixing chamber by contact with the highly heated wall 23, when the water gas entering into the primary mixing chamber through the inlet 22 thoroughly commingles and is mixed with the oil gas, the resultant gas product passing through the opening 25 into the secondary mixing chamber, through the specially prepared checker-work in the latter chamber, thus being more thoroughly blended, whence it passes out, into and up through a mass of specially prepared checker-work in the superheater where it is readily fixed into a commercial gas. The blast gases being more highly heated in their passage through the improved channels formed by my construction will provide an improved and more rapid means of regeneration of the desired temperature for another succeeding run of water gas with less loss of fuel efficiency, and since I provide improved refractory surfaces over those now provided in the standard type of water gas apparatus, the said gas is delivered much higher in temperature, and therefore a drier gas, before it meets the enriching oil being sprayed into the top of the primary mixing chamber of the carbureter, hence assuring improved oil results and a correspondingly superior fixed carbureted water gas product.

While it will be understood that my construction allows for the use of any grade of generator fuel of reasonable good standard, by the use of bituminous coal, I can materially cheapen the production of water gas below the cost made on any of the well known gas apparatus. The oil used to make a 600 B. t. u. standard of carbureted gas will be less than best results obtainable on any known water gas apparatus. Again, I have provided in connection with my apparatus an intake 17 for natural gas, straight coal gas, either rich or lean in B. t. u. quantity as conditions may allow. The said intake is positioned at the top portion of the economizing chamber between the generator and carbureter proper, and provides a mixture between the said rich or lean coal gas and the resulting water gas that is made in the generator, which will permit of a material reduction in the usual enriching oil per M cu. ft. of gas made in my apparatus from what can be shown by the operation of any of the known water gas apparatus.

It is well known that water gas made from bituminous coal is of superior quality to that made from anthracite coal or any grade of coke; the greatest detriment to its use is the liability of its clouding or fouling the passages between the checker-work in the carbureter and superheater, but this fear is allayed by the material employed and the improved method used in the arrangement of the checker work used in my construction, and the use of bituminous coal is preferred since a superior and cheaper gas is produced therefrom.

The gas made by my apparatus will eliminate the excessive production of oily water gas tar, or condensates, due to the fact that the water gas and oil are so blended together as to produce a more stable non-condensable product. This form of apparatus can be built and maintained as cheaply as any of the known type of apparatus employed for the same purpose; all parts are readily accessible when repairs are deemed necessary, and greater economy in maintenance is obtained than for any other known water gas apparatus.

By this construction of apparatus the capacity is increased from 20 to 25 per cent, and the fuel consumption is materially reduced below the best results obtainable by any other known water gas apparatus, and lessen the enriching oil used per M cu. ft. of gas produced, and at the same time a cheaper and superior quality of water gas will constitute the resultant product.

The six bottom rows of checker-work disposed in the superheater or fixer are formed from the standard checker-brick and are so spaced as to suit any desired grade of fuel, then I use what is known as the standard blast furnace brick 2¾ inches square by 9 inches long until these reach the top six courses of the said checker-work, the top six courses being of standard checker brick, like those of the six lower courses, said top six courses being spaced with each course one eighth of an inch wider than the preceding course, hence the top layer or course is spaced wider apart than the other layers or courses to allow for the natural expansion of the gas, then an increased area of refractory surfaces are formed and an improved method of arranging the checker-work is employed.

By injecting coal gas of low B. t. u. standard through the intake 17 into the upper part of the chamber 12, and mixing it with the water gas under high temperature regulation and control, said temperature control causes a more intense affinity and more thorough blending of the gases, thus resulting in the production of an increased volume of a uniform non-stratifiable, and non-condensable commercial gas of the desired B. t. u. quality, such as may be required in any particular locality, while the injection of natural gas of high B. t. u. standard through said intake, and mixing it with uncarbureted water gas under high temperature control serves to reduce its B. t. u. quality, and results in producing an increased volume of uniform commercial gas of the B. t. u. standard such as may be required or desired, as will be readily obvious to those skilled in the art of the production of gases.

It will be understood that by the construction and arrangement of the apparatus hereinbefore described I am enabled to prolong the gas run from 20 to 30 per cent longer than in the existing standard gas apparatus, for the reason that the air is so delivered as to cause a regeneration of heat in the fuel bed and on the increased area and improved refractory surfaces employed.

Having thus described my invention, what I claim and desire to secure by Letters Patent is:—

1. An apparatus for making water gas, comprising a generator, a carbureter connected therewith, an economizing chamber formed at one side of said carbureter and connected to the generator, said chamber having a lateral outlet passage connected to a primary fixing chamber formed at the top portion of the carbureter, and a secondary mixing chamber within the carbureter having checker-work disposed therein.

2. An apparatus for making water gas, comprising a generator provided with inlets for steam and air, a carbureter, an economizing chamber forming one side portion of said carbureter and connected with the generator, a horse shoe shaped wall at the top portion of the carbureter forming a primary mixing chamber, a secondary mixing chamber formed in the body and lower portion of said carbureter, and a superheater or fixing chamber connected with the carbureter.

3. An apparatus for making water gas, comprising a generator, a carbureter, an economizing chamber forming a portion of said carbureter, means independent of the opening from the generator for injecting coal gas into said chamber, a U-shaped wall sealed by expansion against the inner upper surface of said carbureter forming a primary mixing chamber, means for spraying oil into said mixing chamber, a secondary mixing chamber formed in the carbureter, and a fixing chamber or superheater connected with said carbureter.

4. An apparatus for making water gas, comprising a generator, a carbureter, an economizing chamber formed at one side of the carbureter and thickly lined with refractory material, means independent of the opening from the generator for injecting rich or lean coal gas into said chamber, a horse shoe shaped wall sealed by expansion against the upper inner surface of said carbureter forming a primary mixing chamber, means for spraying oil into the mixing chamber, a secondary mixing chamber formed in the carbureter with checker-work therein, and a fixing chamber or superheater with specially arranged checker-work material disposed therein.

5. An apparatus for making water gas, comprising a generator, means for injecting blasts of air and steam therein, a carbureter, an economizing chamber connected with said generator and carbureter thickly lined with refractory material, means independent of the opening from the generator for injecting combustible gas into the upper end portion of said chamber, a horse shoe shaped wall sealed against the inner upper surface of the carbureter forming a primary mixing chamber, means for spraying oil into the upper end of the mixing chamber, a secondary mixing chamber formed within the carbureter, and a superheater or fixing chamber having specially arranged checker-work formed of different sizes and materials therein.

6. An apparatus for making water gas, comprising a generator, a carbureter connected therewith and formed with an economizing chamber at one side thereof, a primary chamber formed at the top portion of said carbureter with the walls of said chamber sealed by expansion against the inner upper surface of the carbureter, and a secondary mixing chamber within the carbureter having checker-work disposed therein.

7. An apparatus for making water gas, comprising a generator, a carbureter connected therewith formed with an economizing chamber at one side thereof, means independent of the opening from the generator for injecting coal gas into the upper end portion of said chamber, a primary chamber formed at the top portion of the carbureter with the walls of said primary chamber sealed by expansion against the inner upper surface of the carbureter, and a secondary mixing chamber within said carbureter having checker-work disposed therein.

8. An apparatus for making water gas, comprising a generator, a carbureter connected therewith formed with an economizing chamber at one side thereof, means independent of the opening from the generator for injecting combustible gas into the upper end portion of said chamber, and a primary chamber formed at the top portion of the carbureter with the walls of the primary chamber sealed by expansion against the inner upper surface of the carbureter, and a secondary mixing chamber formed in said carbureter.

9. An apparatus for making water gas, comprising a generator, a highly heated chamber communicating with said generator, means independent of the opening from the generator for injecting combustible gas into the upper end portion of said chamber into contact with water gas, and means forming a primary mixing chamber with walls sealed by expansion at the top thereof, said walls being adapted to lead the gases into the mixing chamber in a plurality of streams.

10. An apparatus for making water gas, comprising a generator, a highly heated chamber communicating with said generator, means independent of the opening from the generator for injecting combustible gas into the said chamber into contact with water gas, and means forming a primary mixing chamber with walls sealed by expansion at the top thereof, said walls dividing the gases into a plurality of streams as they enter said mixing chamber.

11. An apparatus for making water gas, comprising a generator, a highly heated chamber communicating with said generator, means independent of the opening from the generator for injecting combustible gas into said chamber, a carbureter, a primary mixing chamber formed at the upper end portion of the carbureter with its upper walls sealed by expansion against the inner top surface of said carbureter, means at the top of the carbureter for spraying oil into contact with said walls, and a secondary mixing chamber formed in said carbureter.

THOMAS F. HOLDEN.